INVENTOR.
GERALD WESTHEIMER
BY LEE FELSENSTEIN

ATTORNEY

United States Patent Office 3,453,437
Patented July 1, 1969

3,453,437
AUTOMATIC PHOTOELECTRIC KERATOMETER UTILIZING A CATHODE RAY TUBE SWEEP CIRCUIT WHICH IS SYMMETRICALLY TRIGGERED BY LIGHT FROM EXTREMITIES OF THE MEASURED SURFACE
Gerald Westheimer and Lee Felsenstein, Berkeley, Calif., assignors to The Regents of The University of California, Berkeley, Calif.
Filed Apr. 17, 1967, Ser. No. 631,465
Int. Cl. H01j 39/12; G02f 1/28
U.S. Cl. 250—217                    5 Claims

ABSTRACT OF THE DISCLOSURE

Automatic measurement of the radius of curvature of the cornea or other spherical reflective surface is obtained in the form of an electronic signal with an accuracy comparable to that of optical keratometers. A light pattern is moved across the face of a cathode ray tube, imaged by a lens and reflected off the cornea. Photocells are placed at either side of the optical axis to receive reflection of the light from the tube off the cornea. The photocells are arranged to reverse the direction of movement of the line across the cathode ray tube face and hence the time interval for each traverse of the line across the tube is a function of the radius of the surface being measured. Electronic circuitry is provided to materially reduce the skill of the operator in aligning the instrument with the eye, focusing, measuring the curvature and reading out the results.

---

Figure 1:
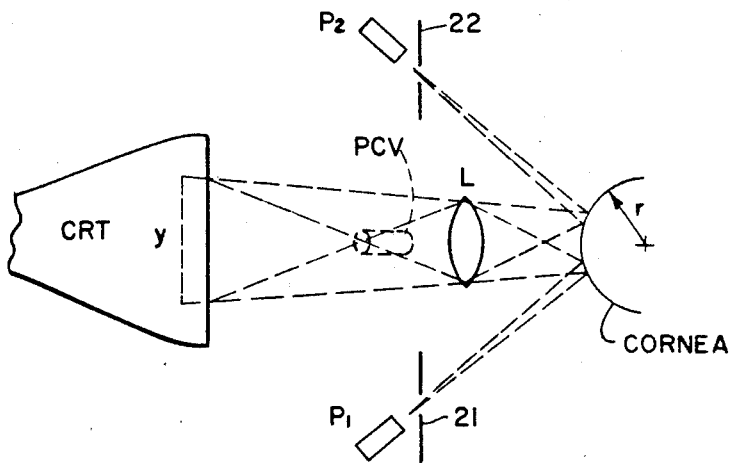

The invention described herein was made in the performance of work under a United States Public Health Service grant.

Keratometry, the art to which this invention pertains, has heretofore involved optical measurement which is highly dependent upon the skill and experience of the operator. A principal purpose of the present invention is to reduce the degree of skill required to make accurate measurements.

One of the problems in measuring the curvature of the anterior surface of the cornea is the fact that eye movement of the patient influences the measurements. Heretofore, instruments used in the art have been based on measuring with the "doubling" technique the size of the image of a self-luminous target. The present invention is adapted to the doubling technique principle. However, because of compensating factors inherent in the instrument, doubling is not required.

In prior instruments of this general type, a luminous target is presented to the eye and the instrument measures the size of the image reflected in the cornea. Since the image is virtual, it has been imaged by an optical system. The examiner varies either the target size or the amount of doubling and judges when the end point of the measurement is reached. It is this judgment which requires the high degree of skill obviated by the present invention.

With the described device, the skill of the operator is reduced to that necessary to position the subject until electronic indicators attached to the device show that a measurement is possible. In closely controllable application such as the measurement of contact lenses, the initial positioning adjustments can be made preset or automatic, and the device may then be made part of a feedback loop.

The optical geometry of the present invention is such that if uncorrected, a small change in the vertical position (that is, the direction perpendicular to the meridian of measurement) of the cornea would move the image of the pattern far enough to cause a change in the reading. To compensate for this, a third photocell is included in the device with circuitry that automatically adjusts the vertical position of the pattern on the screen so that the reflected image remains in a fixed position with respect to the photocells regardless of small movements of the cornea. Such compensation is not necessary in the direction parallel to the meridian of measurement, since the reading is dependent upon the distance between two points on the pattern and not their absolute location on the screen.

Another feature of the invention is that proper focus can be obtained by varying the distance between the instrument and the cornea until a peak voltage meter indicates a maximum photocell pulse amplitude, or until a relative maximum pattern width is observed, rather than relying on the operator's visual acuity and judgment.

Other objects of the present invention will become apparent upon reading the following specification and referring to the accompanying drawings in which similar characters of reference represent corresponding parts in each of the several views.

Figure 2:
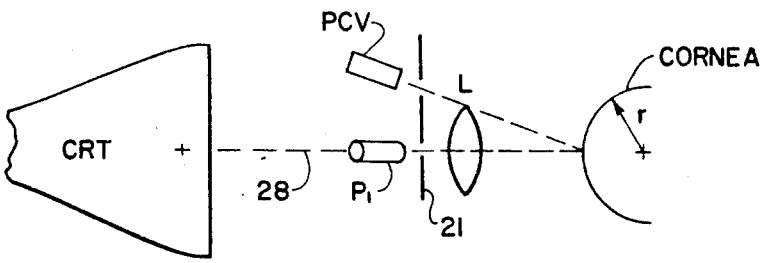
Figure 3:
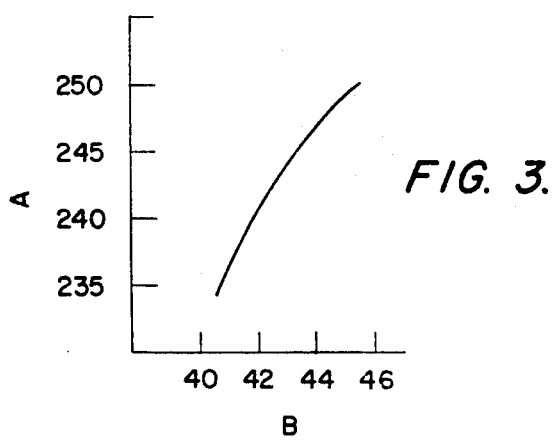
Figure 4:
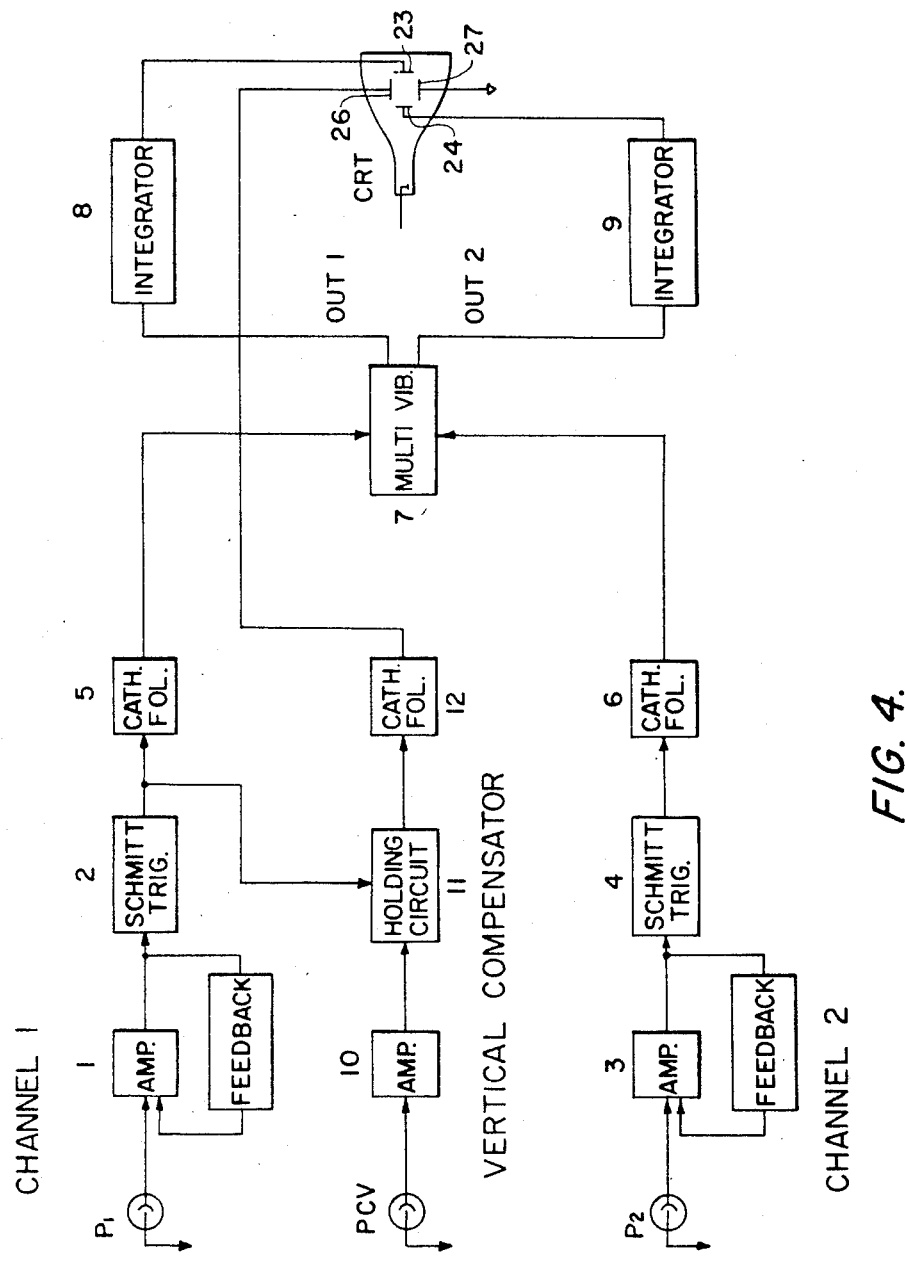
Figure 5:
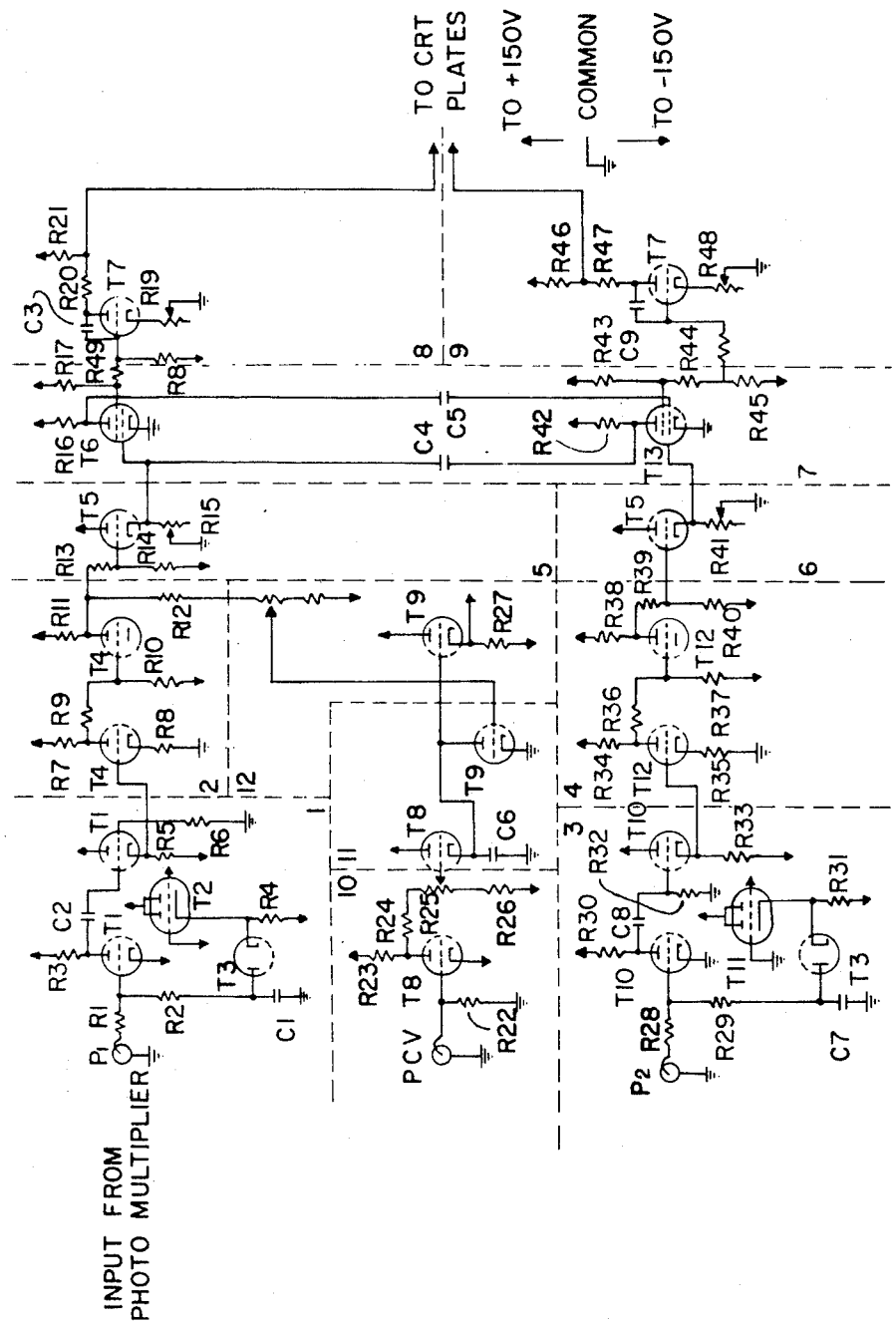

In the drawings:
FIG. 1 is a schematic top plan view of the instrument shown measuring the radius of a cornea.
FIG. 2 is a side elevation thereof.
FIG. 3 is a graph relating output of the keratometer to radiuscope reading in diopters for a series of calibrated surfaces.
FIG. 4 is a block diagram of the circuitry.
FIG. 5 is a wiring diagram thereof.

Cathode ray tube CRT is placed in front of the cornea and a vertical line is made to traverse it horizontally. Lens L is placed between CRT and the cornea. Photocells P1 and P2, each positioned behind a narrow aperture 21, 22, are placed symmetrically on either side of lens L. The instrument is adjusted in front of the cornea until a sharp image of the line on CRT is formed by way of lens L and the cornea in the plane of the photocells. Such sharp image may be determined by moving the instrument antero-posteriorly until a traverse of the line across an oscilloscope screen produces the sharpest peaks of the photocell outputs. The basic variable in the measurement is the horizontal distance $y$ between the two positions of the line on CRT for which its image falls on one or the other photocell P1, P2. Such distance is related to the radius $r$ of the cornea as in prior keratometers. Calculation of $r$ from $y$ and the constants of the instrument is explained in such standard texts as Emsley, Visual Optics, second edition, Chaper IX (Hatton Press, London, 1939). Another means for such calibration is to use ball bearings or other round objects of known radii of curvature located in the same position as the cornea.

In a preferred embodiment of the present invention, the vertical line is made to move at constant speed across the screen of CRT. When it has reached the position at which its image falls on one or the other of the photocells P1 or P2 the output of the latter causes the direction of motion of the line to be reversed. As a result, the line oscillates through distance $y$. Small eye movements will merely shift $y$ laterally, leaving its magnitude unchanged. The time required for a fixed number of back and forth excursions of the line is measured. For the method to work reliably, an automatic photocell gain control is employed to offset variations in reflectance of the cornea. Where blinks or other unexpected signals occur, the readings can be automatically rejected. An alignment device varies the vertical displacement of the sweep to conform to the vertical eye position.

The electronic circuitry used to accomplish the aforementioned effects is shown in block diagram form in FIG. 4. When the image reflected from the cornea impinges upon the aperture 21 or 22 of one of the photocells P1 or P2, the photocell produces an electrical signal in the form of a pulse. Accordingly, each photocell P1 or P2 is connected to a separate amplifier 1, 3 feedback circuit, Schmitt trigger 2, 4 and cathode follower 5, 6, as shown in FIGS. 4 and 5. The amplifiers 1, 3 invert the polarity of the pulses and amplify them to a level of about 20 volts. The feedback circuits set a positive bias level so as to produce a pulse height of a preset value regardless of the input amplitude over a certain range of input values. The output of each amplifier 1, 3 is connected to a Schmitt trigger 2, 4. This stage produces a very large change in output voltage when the input exceeds a certain level. The output of the Schmitt trigger 2, 4 is thus a very large pulse simultaneous with the photocell output pulse. In order to eliminate loading effects, this pulse is stepped down and sent to a cathode follower 5, 6. One trigger 2 is also connected to the vertical holding circuit 12.

The outputs of the cathode followers 5, 6 are connected to the grids of an astable multivibrator. When the Schmitt triggers are in their untriggered states, the cathode followers are cut off and the multivibrator runs freely, producing a square wave output. When a Schmitt trigger fires the resulting positive signal acts as a synchronizing pulse to turn on the half of the multivibrator to which it is connected. If that section is already on, there is no effect. The outputs of the multivibrator 7, which consists of identical square 180° square waves 180° out of phase, are fed to two Blumlein integrators 8, 9. These give outputs of triangular wave form, still 180° out of phase. This wave form is fed through appropriate drive circuits to the horizontal plates 23, 24 of cathode ray tube CRT. Thus the line will be swept back and forth over the tube face in a linear fashion. When a cornea is brought into the measuring position, the signal from the output photocell P1 or P2 will cause the direction of the line to reverse. In order to make vertical positioning less critical, a line instead of a spot is used to sweep across the tube face and this is accomplished by use of a high frequency sine wave applied to the vertical plates 26, 27 of the cathode ray tube to convert what would oherwise be a spot into the aforementioned vertical line.

Automatic vertical adjustment is acomplished by placing a third photocell PCV in the plane of photocells P1 and P2, but displaced vertically from the optical axis 28 so as to "look down" on the cornea. The output of photocell PCV is connected to an amplifier 10 and then to the vertical plates 26, 27 on cathode ray tube CRT in such manner as to cause the reflection of the line to move downward when a signal is produced by photocell PCV. If cathode ray tube CRT is so biased as to cause the plane of the reflection of the line to include this photocell PCV, then the line will sweep normally until photocell PCV produces a signal, at which point the reflection of the line will move downward until it ceases to fall on PCV. The downward movement will then stop. A holding circuit 11 causes the line to stay in vertical position for the remainder of the sweep. A discharge circuit is included to restore the line to its previous position when one of the triggers fires and sends a pulse to the reset input of the vertical holding circuit. Thus the vertical position is readjusted once in every sweep, allowing fast response.

A typical block diagram and a typical wiring diagram are shown in FIG. 4 and 5, respectively. Representative values for the various components of FIG. 5 are shown in the following table:

TABLE OF COMPONENT VALUES

| | | | | |
|---|---|---|---|---|
| R1—100K | R6—100K | R11—33K | | |
| R2—1 meg. | R7—33K | R12—270K | | |
| R3—220K | R8—33K | R13—68K | | |
| R4—100K | R9—330K | R14—150K | | |
| R5—1 meg. | R10—1.5 meg. | R15—500K | | |
| R16—33K | R35—3.3K | C4—0.1 | | |
| R17—68K | R36—330K | C5—0.1 | | |
| R18—1.5 meg. | R37—1.5 meg. | C6—.005 | | |
| R19—50K | R38—33K | C7—0.1 | | |
| R20—220K | R39—68K | C8—.05 | | |
| R21—270K | R40—150K | C9—.01 | | |
| R22—1 meg. | R41—500K | T1—12AX7 | | |
| R23—33K | R42—33K | T2—6J6 | | |
| R24—330K | R43—68K | T3—6AL5 | | |
| R25—500K | R44—680K | T4—6J6 | | |
| R26—1.2 meg. | R45—1.5 meg. | T5—12AT7 | | |
| R27—220K | R46—270K | T6—6AK5 | | |
| R28—100K | R47—220K | T7—12AX7 | | |
| R29—1 meg. | R48—50K | T8—12AT7 | | |
| R30—220K | R49—680K | T9—12AT7 | | |
| R31—100K | R50—680K | T10—12AX7 | | |
| R32—100K | C1—0.1 | T11—6J6 | | |
| R33—1 meg. | C2—0.5 | T12—6J6 | | |
| R34—33K | C3—.01 | T13—6AK5 | | |

In addition to the component values of the preceding table the following additional comments are applicable to the equipment used:

The photocells P1, P2, PCV may be the RCA type 931A photomultipliers, inasmuch as high sensitivity is necessary. The multivibrator operates at a frequency of about 40 Hz. in the non-measuring mode. Power supply is well regulated since small variations in the B-plus voltage cause noticeable changes in output readings. The readout indicator may be a Beckman Universal Eput and Timer Model 7360. Such indicator is connected to measure the total number of cycles during an accurately measured 10-second period. During measurements, the frequency of the multivibrator increases to about 250 Hz. The spot (line) on the cathode ray tube screen may be swept vertically at a frequency of 200 kHz. A tube having P11 phosphor is used in order to obtain short persistence, high light output and spectral characteristics closely matching the spectrum of sensitivities of the photomultipliers. The cathode ray tube used may be of the type used in a Tektronix type 502 oscilloscope modified to use only the last two driving stages.

*Operation*

The subject is instructed to fixate the center of the lens L. The instrument is moved along the line of sight until the image is focused as is indicated by a maximum reading on a meter (not shown, but well understood in the art) monitoring pulse height. The instrument is then ready for the electronic presentation of the target configuration and the measurement of the distance.

The instrument may be focused by adjusting the distance to the cornea until a peak voltage meter (not shown) indicates a maximum photocell pulse amplitude, or until a minimum readout is obtained, or until a relative maximum width of the pattern is observed. The slope of the portion of the pattern during which the vertical compensator makes its adjustment may also be maximized. Tests have indicated that there is a range of about two millimeters over which the focus distance is not critical.

The measurement of the curvature is accomplished by measuring the width of the pattern on the face of CRT. Direct physical measurement is impractical owing to fixation movements of the eye and the corresponding adjustments of the pattern. Since position on the face of the cathode ray tube is a function of the voltage distance of the two plates 23, 24, the width of the pattern can be measured by finding the difference between the maximum voltage excursions at said plates. Since the line is swept at a linear rate, the width can also be measured by the period or frequency of oscillation. Photometric measurement of screen brightness can also be used as a means of measuring width.

Blinks or other effects which may cause the instrument to cease measuring may be noted electronically as a discontinuity in the train of photocell output pulses. Such a discontinuity is easily detected and may be used to inhibit or reset the readout indicator.

It is desirable that measurements be taken with the subject located so as to bring the pattern position to the center of the tube face. The output of the insrument is the time in milli-seconds for a given number of sweeps or, more usually, the number of sweeps in an accurately predetermined period such as one or ten seconds. For a calibration curve, readings obtained on a series of contact lenses previously measured on a radiuscope were plotted against the dioptric power, i.e., $0.3375/r$, where $r$ is the radius of curvature in meters of each of the surfaces. The relation between the variables illustrated in FIG. 3 is curvilinear. Hence the graph of FIG. 3 is used for evaluation of the curvature.

What is claimed is:

1. An automatic keratometer for measuring the curvature of a curved surface such as a cornea, comprising a cathode ray tube, optical means for imaging the light pattern of said cathode ray tube upon said curved surface, a first and a second photocell positioned on opposite sides of said cathode ray tube, apertured first and second screening means for said first and second photocells, respectively, positioned to admit to said photocells only light reflected by said curved surface from said cathode ray tube, and electronic means associated with said first and second photocells to reverse the direction of motion of the light pattern of said cathode ray tube upon activation of each of said photocells.

2. A keratometer according to claim 1 in which said electronic means comprises a sub-circuit for each said photocell comprising in series an amplifier, a Schmitt trigger, a cathode follower, a multivibrator, and an integrator connected to one of a pair of opposed plates of said cathode ray tube.

3. A keratometer according to claim 1 which further comprises a third photocell positioned transverse to a line joining said first and second cells, apertured third screening means for said third cell positioned to admit to said third cell only light reflected by said curved surface from said cathode ray tube, and second electronic means associated with said third cell and connected to one of the plates of said cathode ray tube to adjust the position of the light pattern of said tube in a direction transverse to its sweep upon activation of said third photocell.

4. A keratometer according to claim 3 in which said second electronic means comprises an amplifier and a cathode follower.

5. A keratometer according to claim 4 which further comprises a holding circuit between said amplifier and said cathode follower arranged to hold the sweep of said tube for one sweep.

References Cited

UNITED STATES PATENTS

| | | | |
|---|---|---|---|
| 3,136,839 | 6/1964 | Safir | 351—13 X |
| 3,183,519 | 4/1965 | Harris et al. | 351—17 |
| 3,194,869 | 7/1965 | Eisenberg | 250—217 X |

RALPH G. NILSON, *Primary Examiner.*

T. N. GORIGSBY, *Assistant Examiner.*

U.S. Cl. X.R.

250—201; 351—6, 13, 17; 356—124, 167